United States Patent [19]

Sioles

[11] 3,790,177

[45] Feb. 5, 1974

[54] MECHANICAL COUPLING FOR CONNECTING A SOUND PICKUP TO A SOUND AMPLIFIER

[75] Inventor: George W. Sioles, Palos Verdes Estates, Calif.

[73] Assignee: Mattel, Inc., Hawthorne, Calif.

[22] Filed: Mar. 24, 1972

[21] Appl. No.: 237,848

[52] U.S. Cl. .................. 274/1 A

[51] Int. Cl. .................. G11b 3/00, G11b 25/04

[58] Field of Search .................. 274/1 A, 9 R, 9 B, 15 R

[56] References Cited

UNITED STATES PATENTS

| | | | |
|---|---|---|---|
| 3,370,855 | 2/1968 | Lindsey | 274/1 A |
| 3,286,396 | 11/1966 | Ryan | 274/1 A X |
| 3,208,755 | 9/1965 | Lieberman | 274/1 A |

*Primary Examiner*—Louis R. Prince
*Assistant Examiner*—Charles E. Phillips
*Attorney, Agent, or Firm*—Max E. Shirk

[57] ABSTRACT

Audio beam has one end fixed in a phonograph housing and extends over the recorded-message portion of a phonograph record in contact with a speaker cone and is slideably engaged by a tone arm in all rotated positions thereof. The fixed end of the beam has a compliance which increases the total stiffness of the system by a very small amount. On the other hand, the overall beam construction is made sufficiently stiff to minimize loss of high frequencies.

4 Claims, 5 Drawing Figures

MECHANICAL COUPLING FOR CONNECTING A SOUND PICKUP TO A SOUND AMPLIFIER

BACKGROUND OF THE INVENTION

The background of the invention will be set forth in two parts.

FIELD OF THE INVENTION

The present invention pertains generally to the field of coupling means for loudspeakers and more particularly to a mechanical coupling for connecting a sound pickup to a sound amplifier.

DESCRIPTION OF THE PRIOR ART

In phonograph mechanisms of the type wherein a swingable tone arm traverses a rotating record in contact with a fixed loudspeaker, the driving point for the loudspeaker is not fixed, but varies as the tone arm traverses the record. The usual method of dealing with this problem is to use either a rub-bar extension on the tone arm or to affix a large-radius cap or rub-bar at the apex of the loudspeaker.

Regardless of which method is used, torques are applied to either the cone or the tone arm and compliances are introduced leading to a loss of output. Thus, whereas the tone arm is supposed to drive the cone, it can happen that the tone arm is being driven by a resultant force created by these torques which are applied to either the cone or the tone arm.

SUMMARY OF THE INVENTION

It is the primary object of the present invention to provide a new and useful mechanical coupling for connecting a sound pickup to a sound amplifier exemplifying improvements over the prior art.

Another object of the present invention is to provide a new and useful audio beam for coupling a phonograph tone arm to a loudspeaker which is designed and arranged so as to minimize loss of output.

According to the present invention, apparatus is provided for coupling a recorded-message means to a sound-amplifying means. This coupling apparatus comprises a pickup means for sensing vibrations produced by the recorded-message carrier means, means swingably mounting the pickup means in scanning relationship with the recorded-message carrier means, and elongate sound transmitting means engaging the sound-amplifying means and the pickup means.

The sound-transmitting means has at least one fixed end and another end. The sound-transmitting means extends from the fixed end to a position where an intermediate portion thereof engages the sound-amplifying means. The other end extends over one terminus of the path-of-travel of the pickup means and the fixed end lies adjacent the other terminus of this path-of-travel so that the sound-transmitting means will transmit vibrations from the pickup means to the sound-amplifying means in all rotated positions of the pickup means.

The sound-transmitting means may be made from any suitable material, such as metal or plastic. Both brass and glass-reinforced plastic materials have been found to be satisfactory. A number of other different types of materials will manifest themselves to those skilled in the art.

The sound-transmitting means may have a number of different shapes. One shape, shown herein for purposes of illustration, but not of limitation, is generally tubular with an integral, flat leaf spring portion comprising its fixed end.

Another shape shown herein for purposes of illustration, but not of limitation, is a flat, rectangular leaf spring having a 90° twisted portion at the fixed end, whereby a flat portion of the sound-transmitting means is fixed and an edge portion contacts the sound-amplifying means.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

DESCRIPTION OF THE PREFERRED EMBODIMENT

Figure 1:
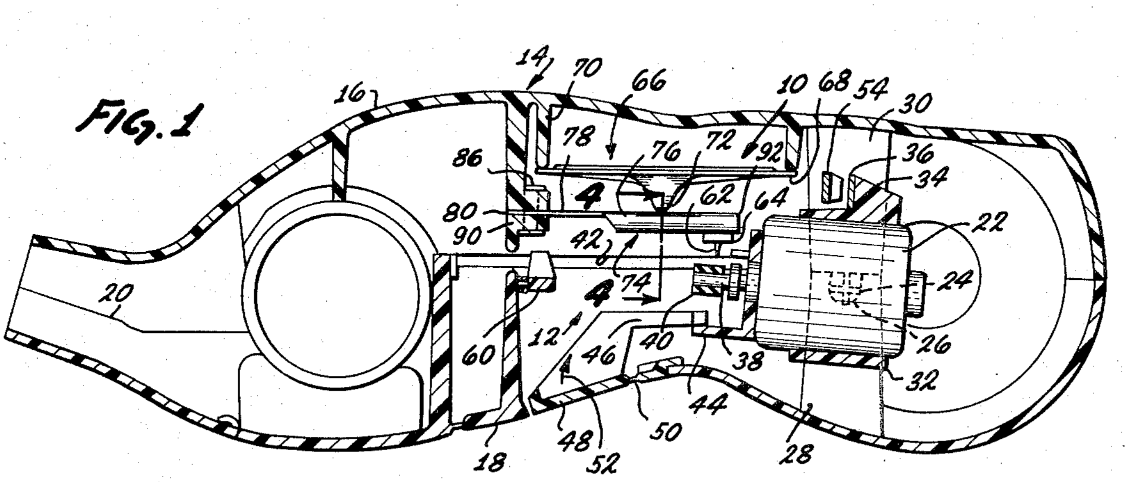
FIG. 1 is a cross-sectional view of a doll torso in which a mechanical coupling constituting a first embodiment of the present invention is mounted.

Referring again to the drawing, and more particularly to FIGS. 1–4, a mechanical coupling for connecting a sound pickup to a sound amplifier constituting a first embodiment of the present invention, generally designated 10, is shown herein for purposes of illustration, but not of limitation, in combination with a phonograph 12 which is mounted in a doll torso 14.

Torso 14 includes a front torso half 16 and a rear torso half 18 connected together along a joining line 20.

Phonograph 12 may include an electric motor 22 swingably mounted in torso 14 on a pair of trunnions, like the one shown at 24 in FIG. 1, each of which is rotatably mounted in a U-shaped slot 26 provided in a strut 28 carried by rear torso half 18. A strut 30, carried by a front torso half 16, engages strut 28 to retain trunnion 24 in position in slot 26. Trunnions 24 are carried by a motor sleeve 32 encompassing motor 22 and including an upstanding tab 34 which carries a spring-loaded electrical contact 36 biasing motor 22 to the position shown in FIG. 1 wherein the output shaft 38 thereof carrying a resilient sleeve 40 lying in approximately the same plane as a record-receiving slot 42 provided in torso 14. Sleeve 32 also carries a finger 44 engaged by an arm 46 on a plate 48 swingably mounted in rear torso half 18 by a hinge 50. When plate 48 is moved inwardly in the direction of arrow 52, arm 46 depresses finger 44 swinging motor 22 in a counter-clockwise direction (as viewed in FIG. 1) on trunnions 24 lowering sleeve 40 and bringing contact 36 into engagement with an electrical contact 54. This energizes motor 22 causing sleeve 40 to rotate.

Phonograph 12 also includes a phonograph record or recorded-message carrier means 56 having a recorded message provided thereon in sound tracks or grooves 58. Record 56 may be inserted into torso 14 through slot 42 where one edge of record 46 is supported by an L-shaped clip 60 and by sleeve 40, which, when plate 48 is released, will push record 56 into engagement with the stylus or needle portion 62 of a pickup means 64 swingably mounted in torso 14 for sensing the audio vibrations produced by message carrier means 56. Sleeve 40 is biased into engagement with record 56 by resilient contact 36 which is closed on contact 54 when record 56 is in position in torso 14.

Phonograph 12 also includes a suitable sound-amplifying means, shown herein for purposes of illustration but not of limitation, as comprising a loudspeaker of speaker cone 66 having a compliant annular rim portion 68 affixed to a cylindrical wall 70 carried by front torso half 16. Cone 66 includes a fixed apex portion 72 which extends inwardly towards record 56.

Vibrations sensed by pickup means 64 are transmitted to cone 66 by an elongate sound-transmitting means or audio beam 74 which engages apex 72 and is slideably engaged by pickup means 64.

Sound-transmitting means 74 may be stamped from a suitable sheet of metal, such as brass, which is then shaped to form a tubular portion 76 and a flat, leaf-spring-like portion 78 having an enlarged portion 80 provided with a pair of apertures 82, 84 receiving a pair of rivets 86, 88, respectively, affixing end portion 80 to a partition member 90 extending inwardly into torso 14 from front torso half 16. Sound-transmitting means 74 also includes a free end 92 extending to a point adjacent the outer periphery 94 of record 56 constituting one terminus for pickup means 64. Needle 62 is adapted to track grooves 58 from this terminus in the direction of arrow 96 (FIG. 2) to the inner periphery 98 of record 56 where needle 62 drops off of record 56 permitting it to become elevated sufficiently so that contacts 36, 54 will open. The inner periphery 98 of record 56 constitutes the other terminus in the path-of-travel of pickup means 64. The tubular portion 76 of sound-transmitting means 74 extends over this path-of-travel for engagement by pickup means 64 at all times during the tracking of groove 58 for transmitting vibrations from needle 62 to speaker cone 66.

The portion 76 of sound-transmitting means 74 should be stiff enough so that pickup means 64 drives cone 66 in all positions of pickup means 64. On the other hand, portion 78 of sound-transmitting means 74 should have slightly more compliance than cone 66 so that the total stiffness of the sound reproducing system will not be increased by a significant amount. Thus, it will be apparent to those skilled in the art that the material from which sound-transmitting means 74 is made should be carefully selected, but is not, on the other hand, critical. Two materials which manifest themselves are brass and glass-reinforced nylon.

Figure 2:
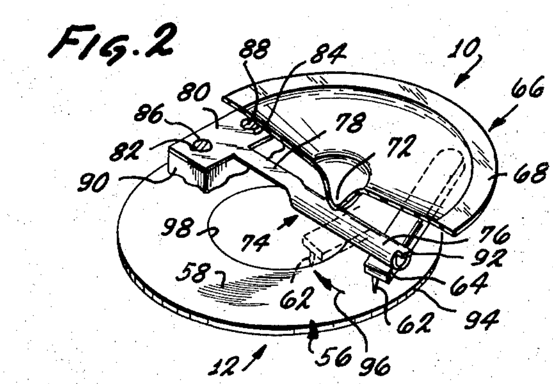
FIG. 2 is an enlarged, partial perspective view of the mechanical coupling of FIG. 1.
Figure 3:
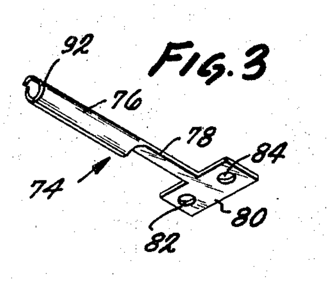
FIG. 3 is an enlarged perspective view of the sound-transmitting means portion of the mechanical coupling of FIG. 1.

Operation of phonograph 12 will be described in connection with FIGS. 1 and 2. It will be assumed that a record 56 is in position in torso 14 and that pickup means 64 has just finished a playing operation where it moved from outer periphery 94 to inner periphery 98 of record 56 and that needle 62 has dropped off of record 56. Resilient contact 36 will then swing motor 22 to the position shown in FIG. 1 wherein contacts 36 and 54 are separated. Plate 48 may then be swung in the direction of arrow 52 lowering sleeve 40 and record 56 sufficiently for a reset spring (not shown) to swing pickup means 64 to its solid line position in FIG. 2 where needle 62 is adjacent outer periphery 94. Plate 48 may then be released and resilient contact 36 will swing sleeve 40 into engagement with record 56 which, in turn, is pressed into engagement with needle 62 without separating contacts 36 and 54 so that motor 22 will remain energized rotating sleeve 40 and record 56. Needle 62 will then track sound grooves 58 from outer periphery 94 to inner periphery 98 while pickup means 64 remains in sliding engagement with portion 76 of sound-transmitting means 74. Vibrations sensed by needle 62 will then pass through pickup means 64 and sound transmitting means 74 into cone 66 which is then being driven by the vibrations produced by grooves 58.

Figure 4:
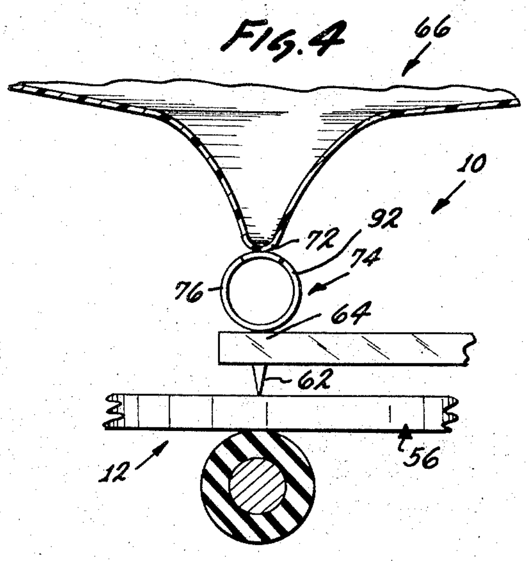
FIG. 4 is an enlarged, partial cross-sectional view taken along line 4—4 of FIG. 1.
Figure 5:
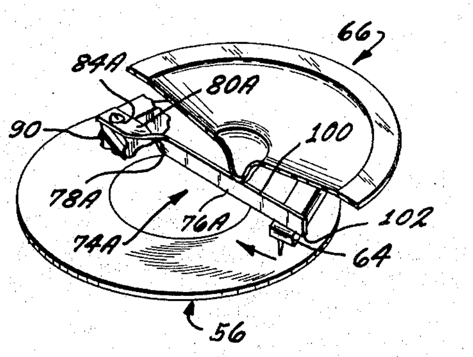
FIG. 5 is a view similar to FIG. 2, but showing a second embodiment of the sound-transmitting means.

A second embodiment of the present invention is shown in FIG. 5 wherein a speaker cone 66 pickup means 64 and record 56 may be identical to the ones shown and described in connection with FIGS. 1, 2 and 4. However, a modified sound-transmitting means 74A may be used in place of the sound-transmitting means 74 previously described.

Sound-transmitting means 74A may be made from a flat, leaf-spring-like piece of material having its fixed end 80A formed by twisting portion 78A thereof 90° with respect to the portion 76A thereof so that one edge 100 of sound-transmitting means 74A will contact cone 66 and the other edge 102 thereof will be contacted by pickup means 64. Portion 78A is provided with an aperture 84A for affixing fixed end 80A to partition 90.

While the particular mechanical coupling means herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims, which form a part of this disclosure.

What is claimed is:

1. A phonograph having a housing, including apparatus for coupling a recorded-message carrier means to a sound-amplifying means comprising:

pickup means for sensing vibrations produced by said recorded-message means;

means on said housing swingably mounting said pickup means in scanning relationship with said recorded-message carrier means; and elongate sound-transmitting means engaging said amplifying means and said pickup means, said sound-transmitting means having only one fixed end portion, said fixed end portion being mounted on said housing, and having a free end portion flexibly connected to said fixed end portion for movement in a plane toward and from said sound amplifying means, said free end portion being substantially rigid in said plane of movement and extending from said fixed end portion to a position where an intermediate portion thereof engages said sound-amplifying means, said free end portion of said sound-transmitting means extending along the path-of-travel of said pickup, whereby said sound-transmitting means will transmit vibrations from said pickup means to said sound-amplifying means in all positions of said pickup means.

2. An apparatus as stated in claim 1, wherein said free end portion of said sound transmitting means comprises a tubular member having an integral, flat, leaf-spring portion flexibly connecting the same to said fixed end portion.

3. An apparatus as stated in claim 1 wherein said sound-transmitting means is a rectangular leaf spring having a 90° twisted portion at said flexible connection whereby a flat portion of said sound-transmitting means is fixed and an edge portion thereof contacts said sound-amplifying means.

4. In a phonograph of the type having a rotatable disc record, a swingable pickup means for traversing said record, and a fixed speaker cone, all mounted on a housing an improved sound-transmitting means, comprising:

an elongate member engaging said speaker cone and said pickup means, said sound-transmitting means having only one fixed end portion, said fixed end portion being mounted on said housing and having a free end portion flexibly connected to said fixed end portion for movement in a plane toward and from said sound amplifying means, said free end portion being substantially rigid in said plane of movement and extending from said fixed end portion to a position where an intermediate portion thereof engages said speaker cone, said free end portion of said sound-transmitting means extending along the path-of-travel of said pickup means, whereby said sound-transmitting means will transmit vibrations from said record to said cone in all positions of said pickup means.

* * * * *